United States Patent [19]

Rumney

[11] Patent Number: 4,703,776

[45] Date of Patent: Nov. 3, 1987

[54] SNOW HYDRANT

[76] Inventor: Roger E. Rumney, Rte. 1, Box 87, Dorset, Vt. 05251

[21] Appl. No.: 828,614

[22] Filed: Feb. 12, 1986

[51] Int. Cl.[4] .............................. F16K 1/48; F16K 1/52
[52] U.S. Cl. .............................. 137/625.3; 137/625.33; 251/217; 251/339
[58] Field of Search ..................... 251/339, 216, 217; 137/625.3, 625.33, 285

[56] References Cited

U.S. PATENT DOCUMENTS

| 504,594 | 9/1893 | Knickerbacker | 251/217 |
| 612,914 | 10/1898 | Schmidt | 251/217 |
| 1,538,912 | 5/1925 | Taylor | 251/217 |
| 1,674,074 | 6/1928 | Turner | 251/217 |
| 2,100,457 | 11/1937 | Trott | 251/339 |
| 2,117,182 | 5/1938 | Lewis | 137/625.3 |
| 2,336,653 | 12/1943 | Taylor | 137/625.3 |
| 2,541,176 | 2/1951 | Rockwell | 137/625.3 |

Primary Examiner—Arnold Rosenthal
Attorney, Agent, or Firm—Schmeiser, Morelle & Watts

[57] ABSTRACT

A method and device for valving liquid flow through a conduit which avoids high pressure flow characteristics such as valve chatter due to turbulence and turbulence-enduced corrosion by spoiling the flow of liquid so as to break up the liquid front into diverse streams and thereafter closely regulating flow through the incipient stage to full flow stage.

2 Claims, 2 Drawing Figures

SNOW HYDRANT

BACKGROUND AND OBJECTS OF THE INVENTION

The present invention relates generally to high pressure and high flow liquid fluid hydrants used in the regulation of fluid flow, and relates more particularly to certain new and useful improvements in valve design and assembly.

As is well known to those engaged in the design and production of hydrants and hydrant assemblies, particularly valve body assemblies, it is necessary to provide systems which are compatible with fluid flow characteristics. This is done so as to minimize unusual effects such as chatter or turbulence during the operation of the fluidic system. When systems are relegated to low operating pressures, such adverse fluid flow characteristics are rarely present. However, when the system is to involve high pressures or high flow rates, turbulence is a frequent problem having significantly detrimental effect upon the overall system.

I have long been associated with the manufacture of hydrants such as are herein discussed. Currently, man-made snow is produced from water systems employing common hydrants. However, because of the need to use high pressure water, in rather significant volumes, standard hydrants possessing conventional plunger or gate valves are confronted with severe wear problems. These wear problems are characterized by moderate to severe corrosion on or around any surface at points of abrupt geometry change, such as discontinuations in linear surfaces or, at points at or near areas of cavitation or turbulence.

To attempt to use presently available valve bodies and tubing which would encourage high speed laminar flow would prove fruitless in the face of evidence which has clearly discloed that conventional valve parts are the root of the problem.

In addition to the corrosion precipitated by turbulence, other and more apparent nuisances also manifest themselves with the use of conventional valves and valve parts. For example, high pressure fluids effect a great pressure drop across an orifice and, in the case of a partially opened conventional valve, give rise to turbulence-caused vibrations. If a valve stem vibrates, an operator will observe the valve opening by itself. To thwart this characteristic, some manufacturers have attempted to lock valves. However, this approach is unsatisfactory because, in the artificial snow manufacturing environment, a frozen locking mechanism can present as much difficulty as a frozen valve.

High pressure/high flow can give rise to turbulence during initial operations that, in turn, invariably creates an excessive amount of corrosion on the valve surfaces immediately downstream of the valve seat. When one considers that these hydrants are placed below ground, it is intuitive that the turbulence and consequent corrosion presents a greater problem than vibration—frequent valve change requirements. One approach to limit vibration and the turbulence at the valve seat is by employing a complex internal fluid riser which is perforated and assembled in a caisson-like fashion, and which is drawn out of the valve seat. The valve stem, on which is mounted a washer-type apparatus, passes down through the major portion of the body and connects to the perforated riser. As the valve stem is withdrawn, successive numbers of perforations are exposed and the fluid flows through them in increasing amounts. This multiplicity of openings, in effect, avoids the abrupt pressure drop that takes place in conventional plunger or gate type valves. The difficulty with this type of mechanism arises in the event the perforations become plugged. Because of its design, with the flow always emerging from the topmost, exposed perforations, it is generally impossible to flush a plugged mechanism by merely opening the valve further. Thus, as mentioned above, in the process of snow making with such valves located far below grade, it becomes necessary to excavate.

The use of conventional valves is also disadvantageous in that the metal, (generally brass), under the turbulent conditions mentioned above, is found to corrode.

It is, therefore, an object of this invention to provide a new and improved high pressure liquid valve which can be used in hydrants of the type mentioned above.

Another object of this invention is to provide a new and improved valve washer which will be compatible with a valve seat formed of a non-corrosive material.

Another object of this invention is to provide a hydraulic valve washer which will give the effect, when opening, of a multi-apertured gate, and thus avoid abrupt and large pressure changes during initial fluid flow.

Another object of this invention is to provide a new and improved washer which will resist plugging and, in the event clogging or plugging occurs, be self-flushing.

Another object of this invention is to provide a novel valve washer seat that will resist corrosion and vibration whether under initial flow characteristics or full flow.

Objects and advantages of the invention are set forth in part herein and in part will be obvious herefrom, or may be learned by practice with the invention. The invention consists in the concept, novel parts, constructions, arrangements and improvements that are shown and described herein.

SUMMARY OF THE INVENTION

I have found that the objects of this invention may be realized by casting a hydrant valve body in its traditional configuration of a straight pipe, male threaded at one end, female at the other. Within the body, there is provided means for receiving a threaded shaft; said shaft serves as the valve stem. The receiving means is sufficient to mount the shaft, provide a stop for the valve seat, and still allow the free passage of the working fluid. The valve seat consists of a cylindrical bushing of compatible but non-corrosive material which is machine-fitted into the valve body and may, if desired, abut the stem means. I employ a multi-apertured, threaded bracket to serve as the stem receiving means.

The shaft or stem is threaded on the end which moves down into the receiving or mounting means. At a short distance in from the end of the threaded portion there is affixed to the valve stem a bushing which is restrained from any movement by a roller pin, passing through the bushing and the stem. A washer, cylindrical in shape and having a gasket at one end integral with the washer, is mounted towards the threaded end of the stem, abutting the bushing. Means are provided so that the washer may be easily removed from the valve stem (shaft). The end of the washer facing the threaded end of the stem is serrated, having thereon a multiplicity of V-shaped teeth, not unlike the teeth of a gear or saw. The stem is mounted in the valve body so that the teeth of the washer are presented opposing the flow of fluid, which passes into one end of the hydrant, through or around the stem mounting means, through the non-corrosive valve seat encountering the V-shaped teeth and, in the valve open case, past the area defined by the valve seat surface and the gasket of the valve washer.

Thus, when initially operating the valve, the valve stem is rotated and the cylindrical valve washer begins to move out of its snug-fitting non-corrosive valve seat. As the washer moves out, fluid will begin to escape first at the verticles of the multiple V-shaped orifices. This has the effect of multiple openings of very minute size. Under this initial condition, pressure drop will not be as abrupt as in the conventional valve opening case and turbulence will thus be avoided. The valve may now be moved to its fully open position. If for some reason, there is a blockage in any of the vertices of the multiple openings, the operator has but to open the valve further and the hydraulic pressure will force a cleaning of the entire valve.

It will be understood that the foregoing general description and the following detailed description as well are exemplary and explanatory of my invention, but should not be considered as limiting thereon. The accompanying drawings, as well, illustrate my preferred embodiment and together with this description, serve to explain the principles of my invention.

DESCRIPTION OF THE PREFERRED EMBODIMENT

Figure 1:
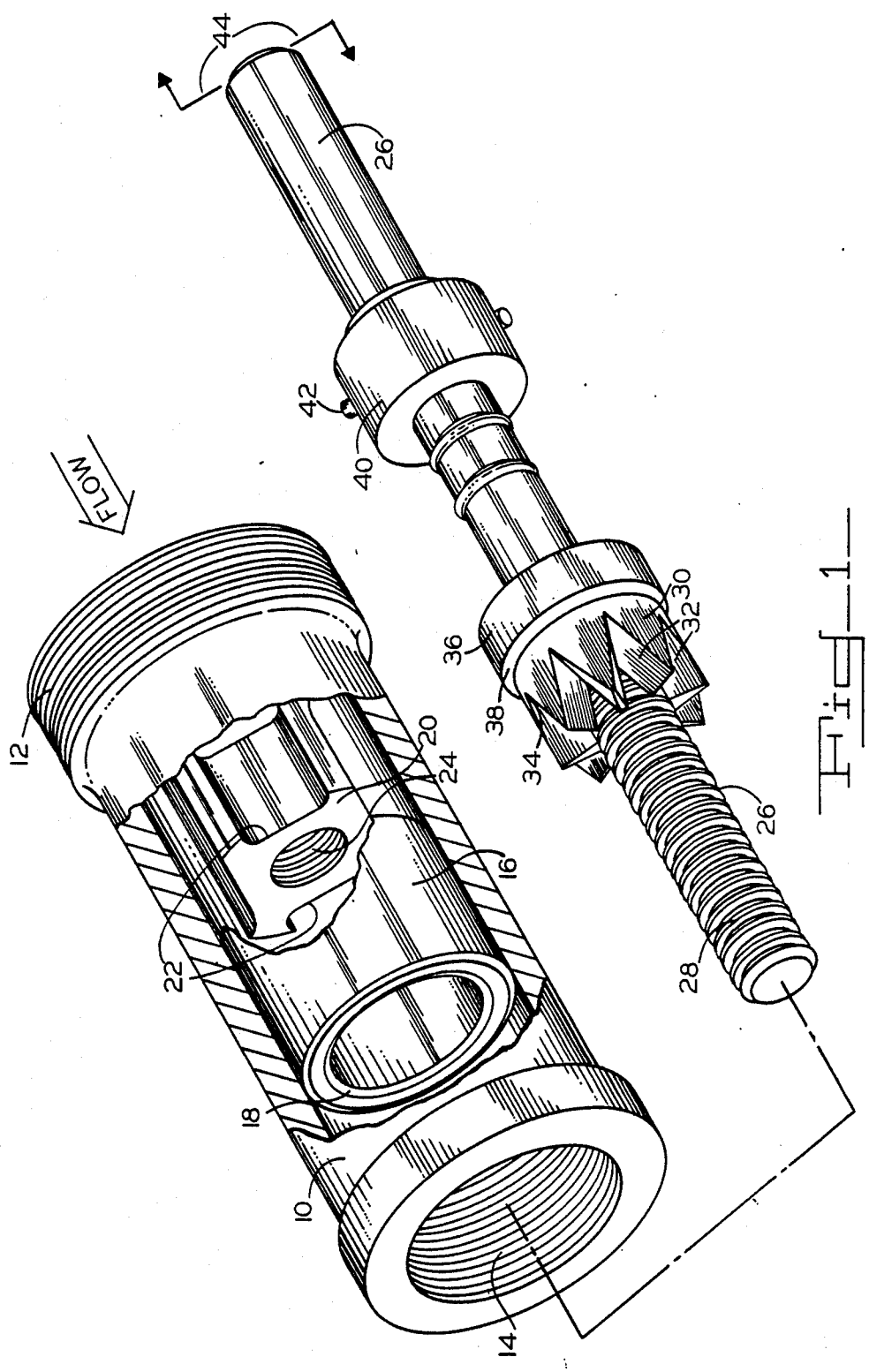
FIG. 1 is a disassembled and partially cutaway perspective view of the subject invention.
Figure 2:
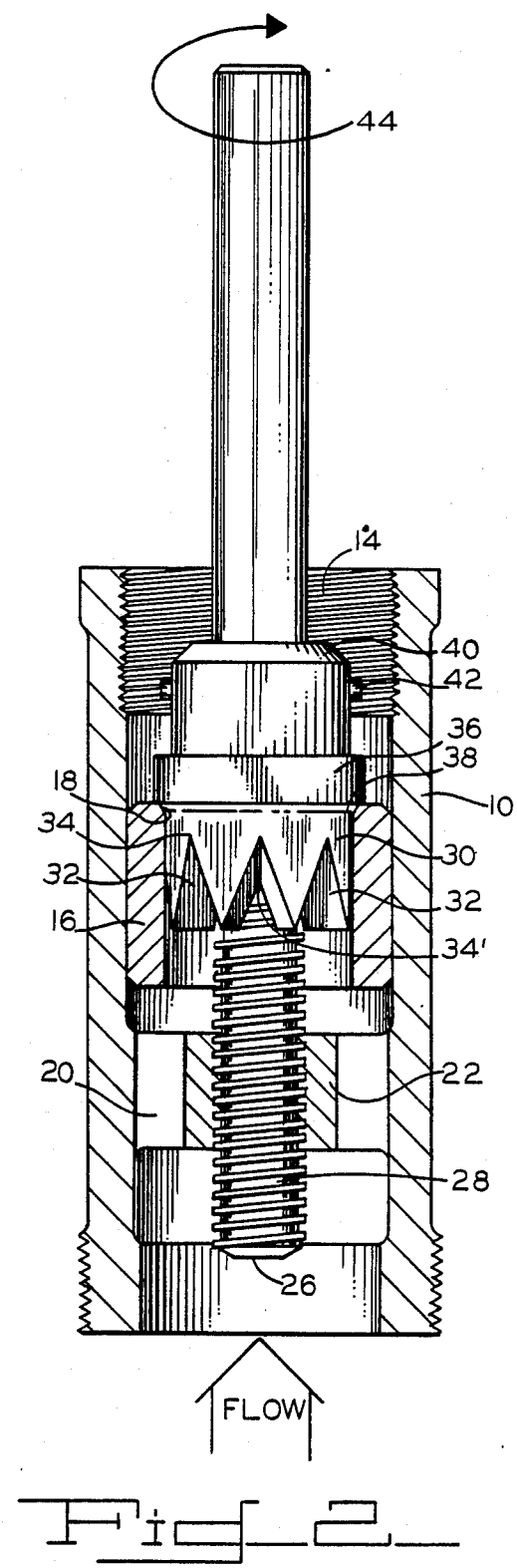
FIG. 2 is a cross sectional elevation of the assembled hydrant.

Referring more particularly now to FIGS. 1 and 2 of the accompanying drawings, there is illustrated a conventional arrangement of my invention.

The embodiment herein shown consists of a cylindrical pipe 10, which forms the base member of the hydrant, male threaded 12 at one end and flanged to receive internal threading 14 at the other. It is not necessary to employ threaded hydrant fixtures; however, irrespective of the means for mating to a piping network, the hydrant must be installed so that waterflow is in the direction indicated in FIGS. 1 and 2.

At approximately one half the distance into the pipe member 10, there is mounted a valve seat 16 which is constructed from non-corrosive material. The flow-exit portion of the valve seat 16 is shaped by suitable production methods to form a smooth contact surface 18. The valve seat 16 may be integral with the pipe member 10 or a separate piece which is pressed into the pipe member 10, spot welded, or fixed by suitable means. Immediately upstream of the valve seat 16, is positioned the shaft receiving means 20. This piece may be cast integrally with the pipe member, fitted into it subsequent to the pipe member construction, or welded in place before the seat 16 is fixed within the pipe member 10. It is also conceivable that the shaft receiving means 20 may be constructed integrally with the valve seat 16. The shaft receiving means 20 is centrally threaded 24, to receive the valve shaft 26, while it is also suitably apertured 22 to allow free passage of liquid through the hydrant.

The remaining subpart of the valve assembly, termed the spoiler-washer subassembly, is comprised of three elements which could conceivably be formed from a single piece of material. For purposes of clarity, simplicity and allowing a reader to infer alternative production methods, the washer subassembly shall be described as herein embodied.

The washer subassembly rides on shaft 26 which has threads 28 at one end and is insertably mounted in the manner depicted in FIG. 1 and FIG. 2 into the shaft receiving means 20 via the centrally threaded hole 24. As liquid flows through the hydrant, it will encounter shaft mounting means 20, pass through apertures 22 and encounter flow spoiler 30. The flow spoiler 30 divides the water front as it engages the serrated face 32 of the spoiler, creating liquid-flow passageways. If shaft 26 has been fully inserted into the hydrant, the after portion of the spoiler 30, the gasket 36, will prevent full-flow to the extent that annular gasket surface 38 is in proximity to valve seat contact surface 18. Bushing 40 is depicted in this embodiment with roller pin 42 affixing means to maintain the position of subassembly 30-38. As mentioned earlier, the entire washer subassembly could conceivably be fabricated from a single piece of material, in which case, "O" rings 39 are employed for removably securing spoiler-washer 30-38 on shaft 26, abutting bushing 40. The use of "O" rings 39 obviates the need for any other sealing mechanism between the spoiler-washer subassembly and shaft 26. Further, upon any required change-out, such securing assures that the sub-assembly will be withdrawn with the shaft.

As the valve stem is actuated through rotating means 44, and withdrawn from the hydrant seat, water begins to flow passing over spoiler serrations 32 and begins to emerge first and contemporaneously at the serration vertices 34, as they are slowly withdrawn from valve seat 16. Because of the close fit between the spoiler circumferential surface 30 and valve seat 16 inside surface, incipient flow must begin at the vertices.

It can be readily seen, therefore, that the objects of this invention are achieved in the following manner:

Upon initial opening, by withdrawal of shaft 26, fluid begins to appear at the downstream side of valve seat 16 at surfaces 18, just as the vertices of the spoiler serrations 34 become exposed. Thus, a multi-apertured gate is realized and the effect of abrupt and large pressure changes during initial fluid flow are avoided, as incipient flow is channeled through passageways created by the serrated face of the spoiler-washer. As the washer subassembly is further withdrawn, fluid flow increases absent initial turbulence and vibration; thus, subsequent chatter and corrosion effects are eliminated. If debris or clutter has accumulated in the spoiler mechanism, completely opening the valve will allow the inflowing liquid to pass rapidly over the serrations 32, 34, and flush the offending debris. This self-flushing activity accomplishes the object of providing an improved flow diverter-washer design which will resist plugging.

The concept of this invention which I have herein described, is not limited to the instant embodiments, but rather, departures may be made therefrom within the scope of the accompanying claims, without departing from the principles of the invention and without sacrificing its technical advantages.

I claim:

1. An in-line fluid valve for below grade installation and which can be repaired above ground comprising:
    a body having a chamber therethrough defined by inlet and outlet ports;
    a threaded apertured bracket mounted within said body near said inlet port, for receiving a threaded shaft;
    a valve seat fixed within said body immediately downstream of said bracket, which provides both a channel for fluid flow and a gasket surface; and
    a rotatable shaft assembly for insertion through said valve seat and into said bracket so as to oppose liquid flow and further comprising a shaft which is threaded at a portion of its upstream end, a slidable shaft-mounted flow spoiler-washer coaxially mounted on a portion of the non-threaded shaft area immediately downstream of said threaded end, securing means comprising at least one shaft-mounted O-ring which functions as a seal between said spoiler-washer and said shaft and also functions as a friction surface for movable securing of said spoiler-washer thereon solely by slidably pushing said spoiler-washer in a axial direction on and off said securing means, said securing means removably securing said spoiler-washer on said shaft so that when said spoiler-washer is secured, it mounts over a non-threaded portion of said shaft and when it is urged axially toward the upstream threaded shaft portion, said spoiler-washer is slidably removable from said securing means, and a bushing mounted on said shaft downstream of said securing means, whereby rotation of said shaft in a direction of closure will drive the threaded end of said shaft into said bracket in a direction opposing the liquid flow carrying therewith by means of said bushing the secured flow spoiler-washer into registry with said valve seat gasket while allowing, upon removal of said shaft assembly from within said body by complete rotation in the opening direction, the rapid retraction of said flow spoiler-washer.

2. The invention of claim 1 wherein said spoiler-washer further comprises an integral, essentially cylindrical insert for said valve seat which has a downstream washer surface for engaging the downstream edge of said valve seat and a serrated face on its upstream surface for breaking up flow into a plurality of streams, said serrated face comprising a plurality of acute vertices.

* * * * *